United States Patent [19]

Mancha

[11] Patent Number: 4,553,300

[45] Date of Patent: Nov. 19, 1985

[54] POCKET "E"-RING INSTALLATION TOOL

[76] Inventor: Clayton S. Mancha, 1445 N. Burke, Visalia, Calif. 93291

[21] Appl. No.: 614,808

[22] Filed: May 29, 1984

[51] Int. Cl.[4] .............................................. B23P 19/00

[52] U.S. Cl. ...................................................... 29/235

[58] Field of Search ................. 29/235, 270, 271, 272, 29/278, 280; 81/177 M; 145/61 E

[56] References Cited

U.S. PATENT DOCUMENTS 1,250,328 12/1917 Langford ......................... 81/177 M 3,137,062 6/1964 Green et al. .......................... 29/270

4,054,986 10/1977 Marres et al. ......................... 29/235

*Primary Examiner*—Robert C. Watson

[57] ABSTRACT

This pocket tool is employed for installing "E"-rings on Diesel injector pump rotor assemblies quickly. Primarily, it consists of a main body for use as a force producing instrument, for final seating of an "E"-ring, and it houses a guide pin when not in use. The guide pin is used to enlarge the openings in the ring, so as to enable the ring to receive the headed posts of the rotor assembly.

1 Claim, 10 Drawing Figures

FIG. 1
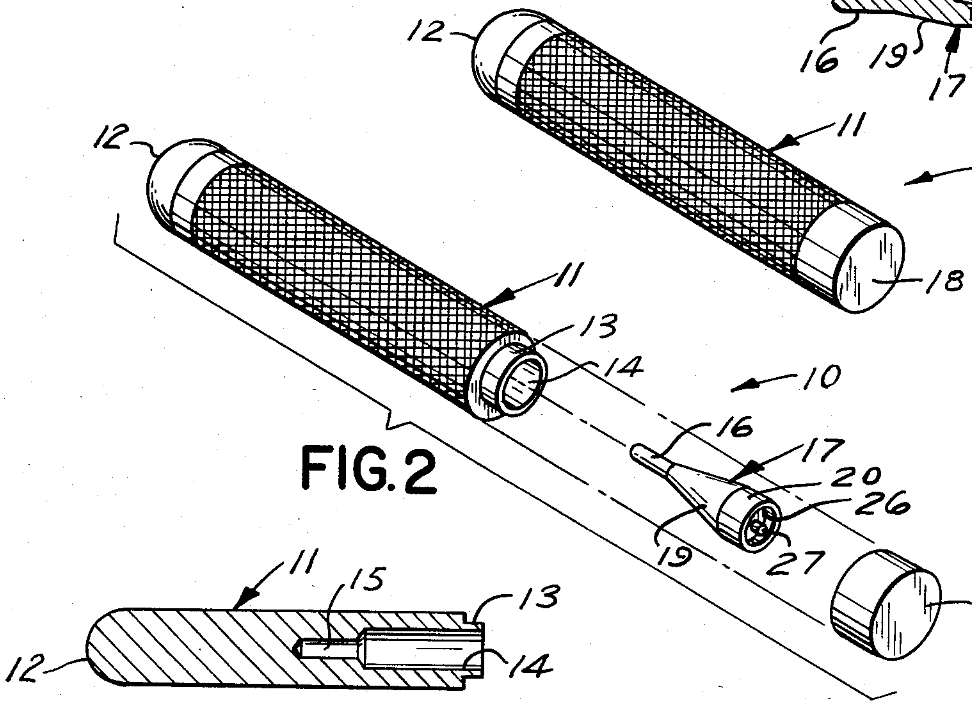
FIG. 4
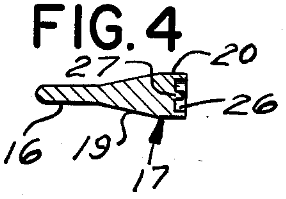
FIG. 2
FIG. 5
FIG. 3
FIG. 6
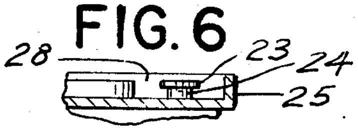
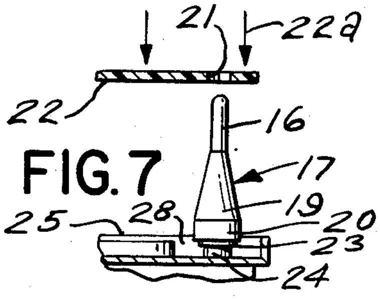
FIG. 7
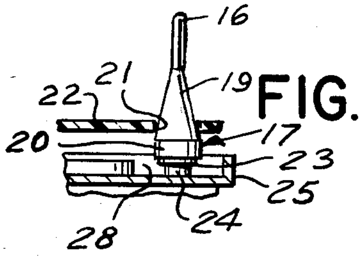
FIG. 8
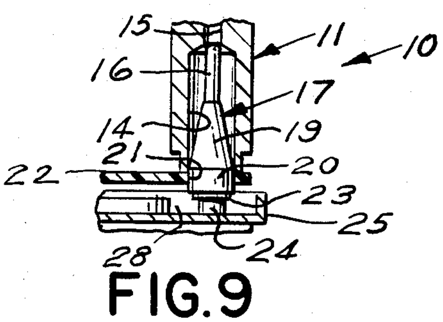
FIG. 9
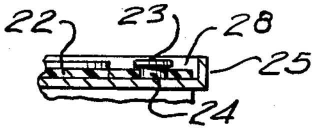
FIG. 10

POCKET "E"-RING INSTALLATION TOOL

This invention relates to tools for engine pumps, and more particularly, to a pocket "E"-ring installation tool.

The principal object of this invention is to provide a pocket "E"-ring installation tool, which will be employed for installing such rings on Diesel injector pump rotor assemblies.

Another object of this invention is to provide a pocket "E"-ring installation tool, which will be unique in design, in that, when it is employed, it will reduce installation time of such rings from approximately thirty minutes to three or four minutes.

Another object of this invention is to provide a pocket "E"-ring installation tool, which will be of such design, that no other tools will be required to hold the pump assembly during the ring installation, and no other tool will be required to help position the ring, either.

A further object of this invention is to provide a pocket "E"-ring installation tool, which will be of such design, that it may be employed by anyone, with only a minimum amount of instruction.

Other objects are to provide a pocket "E"-ring installation tool, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of the present invention, shown in fully assembled condition;

FIG. 2 is an exploded perspective view of the invention;

FIG. 3 is a horizontal elevational view of the main body of the invention, shown in section;

FIG. 4 is a horizontal elevational view of the guide pin of the invention, shown in section;

FIG. 5 is a horizontal elevational view of the cap member, shown in section;

FIG. 6 is a fragmentary side elevational view of a pump rotor assembly, shown broken away, and illustrating a post thereof;

FIG. 7 is similar to FIG. 6, but illustrates a fragmentary and broken away ring, prior to being positioned on the guide pin of the tool;

FIG. 8 is similar to FIG. 7, but illustrates the ring on the conical portion of the guide pin;

FIG. 9 is similar to FIGS. 7 and 8, but illustrates the ring being urged downward on the post by the main body, and FIG. 10 is similar to FIGS. 6–9, but illustrates the ring installed and the tool removed therefrom.

Accordingly, a tool 10 is shown to include a cylindrical main body 11, having a rounded end 12 and a knurled outer periphery, for grippingly engaging main body 11 when it is used as a pusher, which hereinafter will be described. Main body 11 includes a neck portion 13, having an opening 14 longitudinally therethrough, and extending into a smaller counter bore 15 within main body 11. The counter bore 15 serves to house safely the shank 16 portion of guide pin 17, which is received and housed within main body 11, when not in use. A hollow cap 18 is provided for being received on neck 13 portion, so as to retain guide pin within tool 10 when it is not in use, and the assembly of 11, 17, and 18 is readily carried in the user's pocket, for quick use when desired. Guide pin 17 includes a conical portion 19 between its cylindrical portion 20, which serves as a means of expanding the openings 21 of ring 22, enabling the opening 21 to pass onto the cylindrical portion 20 and over the heads 23, and onto the posts 24 of the Diesel injector pump rotor assembly 25.

Guide pin 17 is further provided with a recessed opening 26, having a center projection 27, which is flush with the large diameter end thereof, and projection 27, in combination with the recessed opening 26, is designed to fit and center over heads 23 of posts 24, for maximum effectiveness in the operation of tool 10. The neck portion 13 is also machined to fit down into the recess 28 of rotor assembly 25, where the posts 24 are mounted, to enable the user to work the ring 22 onto the posts 24, if necessary.

In operation, cap 18 is removed from main body 11, and guide pin 17 is removed therefrom. Guide pin 17 is then placed with the recessed opening 26 over the head 23 of a post 24 in the rotor assembly 25. The ring 22 is then placed with its openings 21 in alignment with heads 23 of posts 24. Ring 22 is then brought downward as indicated by the arrows 22a, until one opening 21 thereof receives shank 16 of pin 17. The openings 21 of the rotor assembly 25 are normally one eighth of an inch in diameter, and guide pin 17, with the use of the main body 11, is used to expand openings 21 to a diameter of slightly more than one quarter of an inch, so as to slip ring 22 over the heads 23 of the posts 24. For example, the ring 22 is forced downwards by the user, until the conical portion 19 of pin 17 expands opening 21 to where it is on the upper portion of the cylindrical portion 20. The main body 11 is then used as a pushing means, by placing the opening 14 over pin 17, and pressing body 11 downwards. When the above-mentioned is occurring, the rim of the neck portion 13 engages the top of ring 22, and pushes ring 22 onto the head 23, and finally the post 24 is positioned within opening 21.

As the ring 22 is being installed, it tends to pull toward the center, away from the post 24, and projection 16 of pin 17 enables the user to keep ring 22 on the pin 17 easily, as it is being installed and stretched tighter. Projection 16 also helps center the main body 11 over the pin 17, by entering the counter bore 15 of main body 11. After ring 22 has been seated within assembly 25, guide pin 17 is again placed within main body 11, with projection 16 within counter bore 15, and the cap 18 is again placed upon the neck portion 13.

While various changes may be made in the detail construction, it is understood that such changes will be within the spirit and scope of the present invention, as is defined by the appended claims.

What I now claim is:

1. A pocket "E"-ring installation tool for injector pump rotor assemblies, comprising, in combination, a cylindrical main body having a rounded first end, a knurled side around said main body, a narrowed neck at an opposite second end, a central opening in said second end having a narrow counterbore within an inward end, a guide pin stored in said opening and in said counterbore, a removable cap fitted on said neck; said guide pin comprising a cylindrical main portion fitted within said opening, a shank portion fitted in said counterbore and a conically tapering portion flush therebetween, a recessed opening in an end of said guide pin main portion and a central projection within said recessed opening, an outward end of said projection being flush with an end face of said main portion.

* * * * *